US008614751B2

(12) United States Patent
Ogawa (10) Patent No.: US 8,614,751 B2
(45) Date of Patent: Dec. 24, 2013

(54) IMAGE PROCESSING APPARATUS AND IMAGE PROCESSING METHOD

(75) Inventor: Shigeo Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/461,528

(22) Filed: May 1, 2012

(65) Prior Publication Data

US 2012/0281110 A1 Nov. 8, 2012

(30) Foreign Application Priority Data

May 6, 2011 (JP) ................................ 2011-103520

(51) Int. Cl.
*H04N 5/228* (2006.01)
*H04N 9/73* (2006.01)
*H04N 5/222* (2006.01)
*G06K 9/00* (2006.01)

(52) U.S. Cl.
USPC ..................... 348/224.1; 348/222.1; 348/370; 348/371; 348/223.1; 382/107

(58) Field of Classification Search
USPC ............ 348/222.1, 223.1, 224.1, 225.1, 370, 348/371, 655–658; 382/107
See application file for complete search history.

(56) References Cited

U.S. PATENT DOCUMENTS

| | | | |
|---|---|---|---|
| 5,808,681 A | 9/1998 | Kitajima | |
| 6,597,869 B2 * | 7/2003 | Uchida et al. | 396/155 |
| 2009/0245685 A1* | 10/2009 | Makii | 382/276 |
| 2010/0054592 A1* | 3/2010 | Nanu et al. | 382/167 |
| 2011/0109767 A1* | 5/2011 | Matsunaga | 348/223.1 |
| 2011/0157408 A1* | 6/2011 | Steinberg et al. | 348/222.1 |
| 2012/0008008 A1* | 1/2012 | Nakabayashi et al. | 348/223.1 |
| 2012/0069198 A1* | 3/2012 | Steinberg et al. | 348/207.1 |
| 2012/0069222 A1* | 3/2012 | Steinberg et al. | 348/239 |
| 2012/0081566 A1* | 4/2012 | Cote et al. | 348/222.1 |
| 2012/0081567 A1* | 4/2012 | Cote et al. | 348/222.1 |
| 2012/0194703 A1* | 8/2012 | Bilcu et al. | 348/231.99 |
| 2012/0274798 A1* | 11/2012 | Takahashi et al. | 348/222.1 |

FOREIGN PATENT DOCUMENTS

JP 3540485 B2 7/2004

* cited by examiner

*Primary Examiner* — Chia-Wei A Chen
(74) *Attorney, Agent, or Firm* — Canon USA Inc. IP Division (57) ABSTRACT

An image processing apparatus calculates a difference in color temperature between a first white balance (WB) correction value based on image data with flash and a second WB correction value based on image data without flash. The image forming apparatus calculates motion amounts of an object and the apparatus, and corrects the first and second WB correction values based on the difference in color temperature and the motion amounts. The image processing apparatus, based on the corrected first WB correction value, develops first image data from the image data with flash, and, based on the corrected second WB correction value, develops second image data from the image data without flash. The image processing apparatus calculates a signal component of external light and a signal component of flash and calculates a combination ratio of the first and second image data to combine the first and second image data.

9 Claims, 10 Drawing Sheets

| DIFFERENCE IN COLOR TEMPERATURE | | | | |
|---|---|---|---|---|
| 20 | 20 | 30 | 30 | 40 |
| 30 | 30 | 30 | 30 | 50 |
| 40 | 40 | 40 | 50 | 60 |
| 50 | 50 | 60 | 70 | 70 |
| 60 | 60 | 70 | 70 | 80 |

MOTION AMOUNT

COMBINATION REDUCTION RATIO (UNIT: %)
ACCORDING TO DIFFERENCE IN COLOR TEMPERATURE
AND MOTION AMOUNT

FIG. 10

IMAGE PROCESSING APPARATUS AND IMAGE PROCESSING METHOD

BACKGROUND OF THE INVENTION

1. Field of the Invention

The present invention relates to a technique for controlling a white balance of image data.

2. Description of the Related Art

An imaging apparatus using an image sensor, such as a digital camera or a digital video camera, has a function of white balance control for adjusting color tone of image data acquired by capturing. White balance control includes manual white balance control and auto white balance control.

The manual white balance control previously captures an image of a white object and calculates a white balance coefficient, and the calculated white balance coefficient is applied to an entire image plane. The auto white balance control automatically detects a white portion in the captured image data, calculates the white balance coefficient based on an average value of each color component over the entire image plane, and then applies the calculated white balance coefficient to the entire image plane.

When a light source different from flash light is included in the image data in a scene where the flash is lit, the conventional auto white balance control applies the calculated white balance coefficient as described above to perform the white balance control. Therefore, it is difficult to perform the white balance control for adjusting respective light sources to appropriate colors.

For example, when a low-color temperature light source, such as a bulb color light source, is included as environment light in the scene where the flash is lit, since the flash light is a high-color temperature light source, if the white balance is adjusted to the flash light, it cannot be adjusted to the low-color temperature light source. On the other hand, when the white balance is adjusted to the low-color temperature light source, it cannot be adjusted to the flash light.

Further, even if the white balance control is performed by adjusting the white balance to a middle of the both light sources, the white balance can be adjusted to neither of the light sources. A region illuminated with the flash light becomes bluish, and a region illuminated with the low-color temperature light source becomes reddish.

To address the issue described above, Japanese Patent No. 3540485 discusses a technique described below. More specifically, the technique discussed in Japanese Patent No. 3540485 compares the image data captured when the flash is lit with the image data captured when the flash is not lit for each arbitrary object region to acquire a ratio of the data, and then determines a level of contribution of the flash light according to a value of the ratio.

Subsequently, the white balance control is performed by lighting the flash according to the determined contribution level, and selecting a white balance control value for each object region of the image data when it is exposed.

However, since development processing is performed after the white balance control value is varied for each object region, the technique discussed in Japanese Patent No. 3540485 may not appropriately perform other control, such as color reproduction, on the white balance control value.

Further, there is a time difference in acquisition timing between the image data captured with the flash lit and the image data captured with no flash lit.

Therefore, according to the technique discussed in Japanese Patent No. 3540485, since, when an object is moving or when an imaging apparatus is moving, an illumination area and an amount of illumination may be erroneously detected, tint variation may occur at a boundary portion of the object.

SUMMARY OF THE INVENTION

The present invention is directed to an image processing apparatus capable of reducing tint variation at a boundary portion.

According to an aspect of the present invention, an image processing apparatus includes a correction value calculation unit configured to calculate a first white balance correction value based on image data captured with flash and to calculate a second white balance correction value based on image data captured without flash, a difference calculation unit configured to calculate a difference in color temperature between the first white balance correction value and the second white balance correction value, a motion amount calculation unit configured to calculate a motion amount of at least one of an object and the image processing apparatus, a correction unit configured to correct the first white balance correction value and the second white balance correction value based on at least one of the difference in color temperature and the motion amount, a development unit configured to develop first image data from the image data captured with flash based on the first white balance correction value corrected by the correction unit and to develop second image data from the image data captured without flash based on the second white balance correction value corrected by the correction unit, a component calculation unit configured to calculate a luminance component of external light and a luminance component of flash based on a luminance value of the image data captured without flash and a luminance value of the image data captured with flash, a combination ratio calculation unit configured to calculate a combination ratio of the first image data and the second image data based on the luminance component of external light and the luminance component of flash, and a combination unit configured to combine the first image data with the second image data according to the combination ratio.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
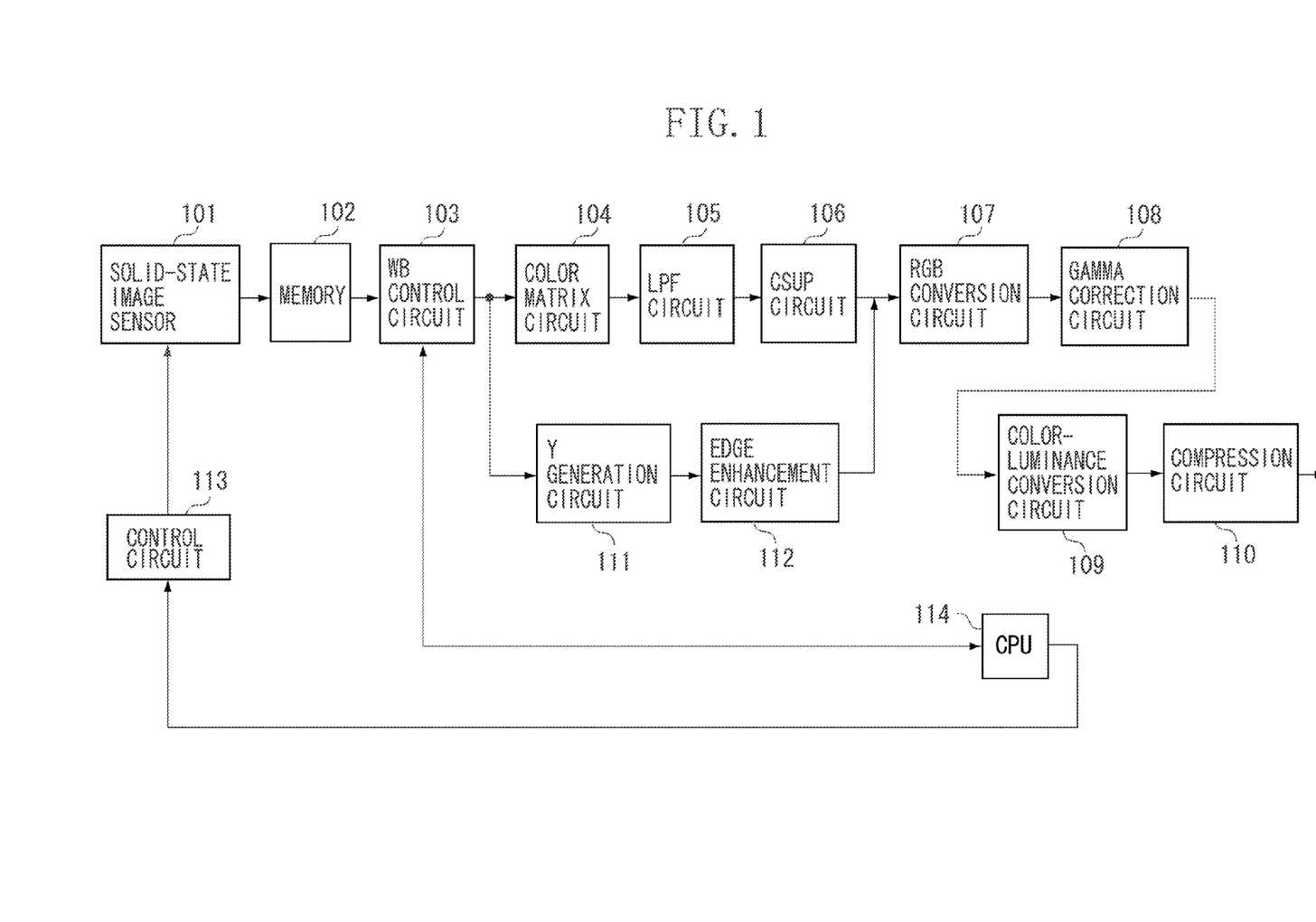
FIG. 1 illustrates a configuration of an imaging apparatus according to an exemplary embodiment of the present invention.

FIG. 1 illustrates a configuration of an imaging apparatus according to an exemplary embodiment of the present invention. In FIG. 1, a solid-state image sensor 101 includes a charge-coupled device (CCD) sensor or a complementary metal-oxide semiconductor (CMOS) sensor, and its surface is covered with a red, green, and blue (RGB) color filter with, for example, the Bayer array. The solid-state image sensor 101 can perform color capturing. A central processing unit (CPU) 114 calculates a shutter speed and an aperture value to brighten the overall image data, and also calculates a driving amount of a focus lens to focus on an object in a focusing area.

An exposure value (shutter speed and aperture value) and the driving amount of the focus lens, calculated by the CPU 114, are output to a control circuit 113. A white balance (hereafter, referred to as "WB") control circuit 103 calculates the WB correction value based on image data stored in a memory 102, and, using the calculated WB correction value, performs WB correction on the image data stored in the memory 102. Details of a method in which the WB control circuit 103 calculates the WB correction value will be described below.

A color matrix circuit 104 converts the image data on which the WB correction is performed by the WB control circuit 103 into color-difference signals R-Y and B-Y by applying a color gain to reproduce the image data in optimum colors. A low pass filter (hereafter, referred to as "LPF") circuit 105 poses limitation on bands of the color-difference signals R-Y and B-Y.

A chroma suppress (CSUP) circuit 106 suppresses a false color signal in a saturated portion of the image data on which the limitation is posed by the LPF circuit 105. On the other hand, the image data on which the WB correction is performed by the WB control circuit 103 is also output to a luminance signal (Y) generation circuit 111, which generate a luminance signal "Y". An edge enhancement circuit 112 performs edge enhancement processing on the generated luminance signal "Y".

The color-difference signals R-Y and B-Y output from the CSUP circuit 106 and the luminance signal "Y" output from the edge enhancement circuit 112 are converted into RGB signals by an RGB conversion circuit 107, and then gradation correction is performed on the RGB signals by a gamma (γ) correction circuit 108. The RGB signal on which the gradation correction is performed is converted into YUV signals by a color-luminance conversion circuit 109, compressed by a compression circuit 110, and then recorded as image data into an external recording medium or an internal recording medium.

Next, the calculation processing of the WB correction value performed by the WB control circuit 103 will be described in detail. First, with reference to a flowchart illustrated in FIG. 2, the calculation processing of a first WB correction value (first white balance correction value), which is the WB correction value during main exposure (when the flash is lit) will be described. The first WB correction value is a correction value calculated based on the image data captured while the flash is lit (hereafter, referred to as "image data with flash").

Figure 2:
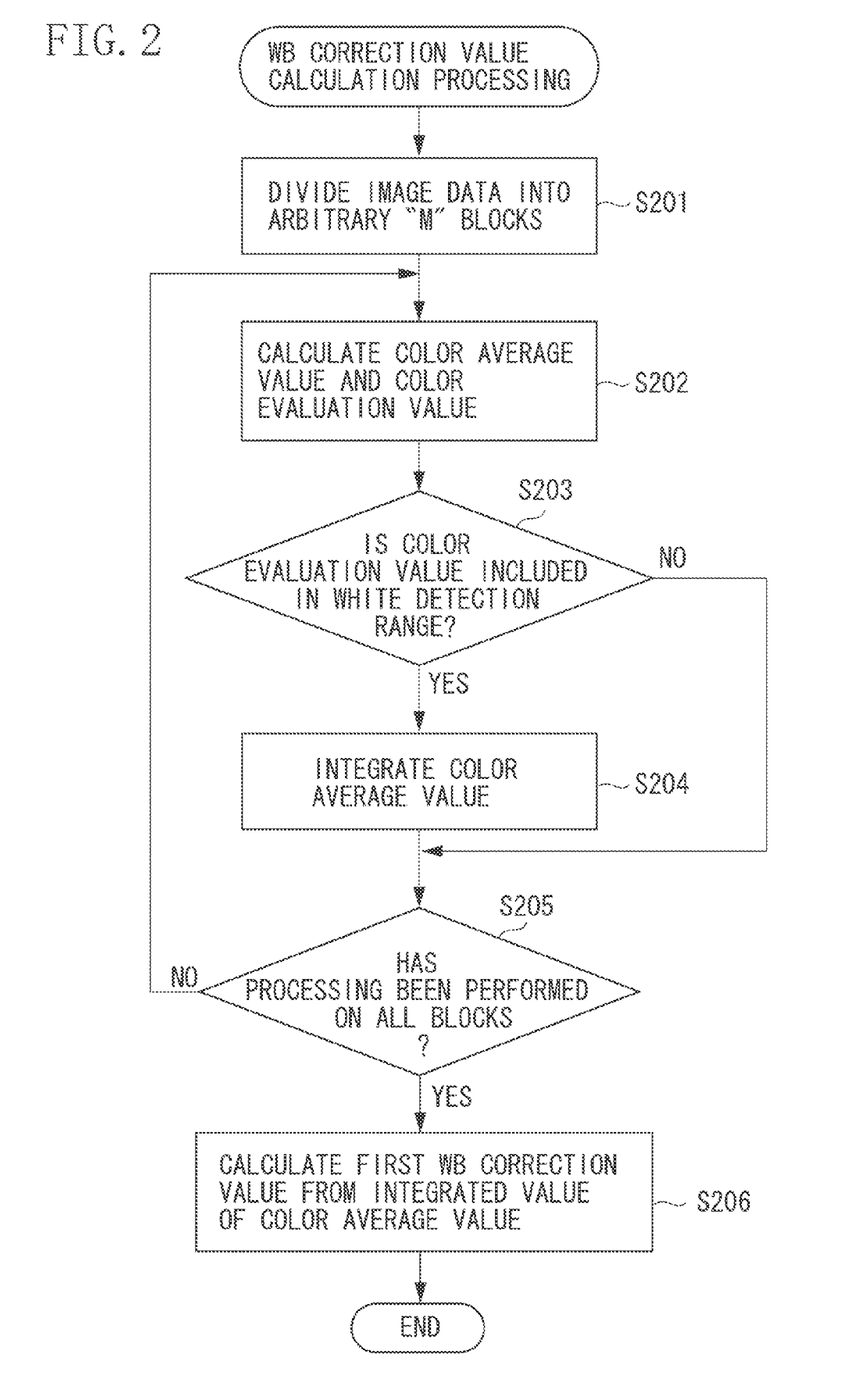
FIG. 2 is a flowchart illustrating processing for calculating a first white balance (WB) correction value when flash is lit.

In step S201, the WB control circuit 103 reads the image data with flash stored in the memory 102, and divides the image data with flash into arbitrary "m" blocks. In step S202, the WB control circuit 103 adds and averages pixel values for respective blocks (1 to "m"), calculates color average values (R[i], G[i], and B[i]), and then calculates color evaluation values (Cx[i] and Cy[i]) using the following equations:

$$Cx[i]=(R[i]-B[i])/Y[i]\times 1024$$

$$Cy[i]=(R[i]+B[i]-2G[i])/Y[i]\times 1024$$

where $Y[i]=(R[i]+2G[i]+B[i])/4$.

Figure 3:
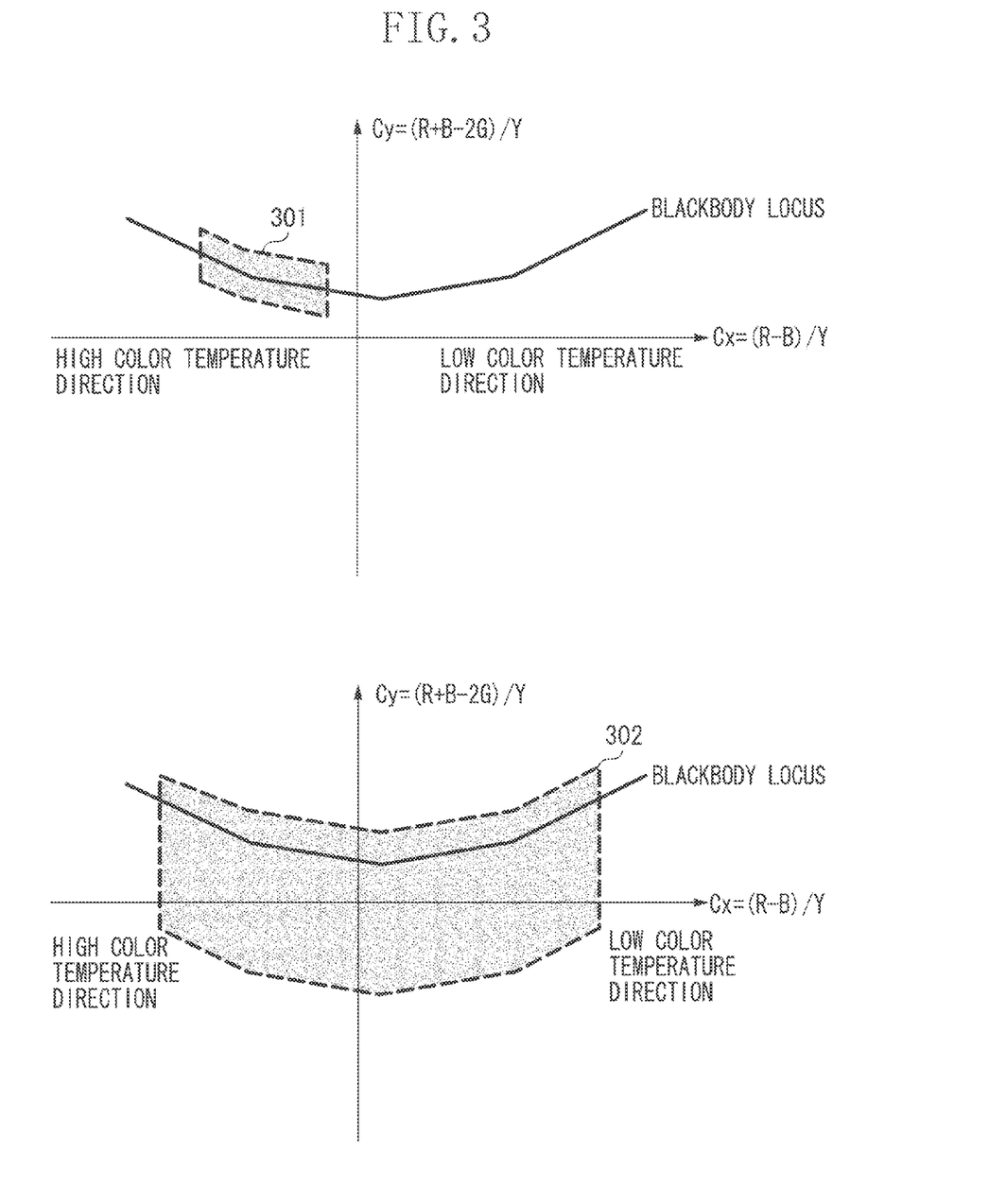
FIG. 3 illustrates graphs to be used when white is detected.

The WB control circuit 103 detects white using graphs including coordinate axes illustrated in FIG. 3. A negative direction of the "x" coordinate (Cx) indicates the color evaluation values when the white of a high-color temperature object is captured, and a positive direction thereof indicates the color evaluation values when the white of a low-color temperature object is captured. Further, the "y" coordinate (Cy) indicates a level of green component of a light source. The larger in the negative direction the level of the green component is, the more the green component is included. The light source including the large amount of green component is meant to be fluorescent lighting.

In step S203, the WB control circuit 103 determines whether the color evaluation values (Cx[i] and Cy[i]) of the i-th block calculated in step S202 are included in a previously set white detection area 301 illustrated in FIG. 3. Since the white detection area 301 is generated with the flash light, which is a known light source, the detection area is limited.

When the color evaluation values (Cx[i] and Cy[i]) of the i-th block are included in the previously set white detection area 301, the processing proceeds to step S204. On the other hand, when the color evaluation values (Cx[i] and Cy[i]) of the i-th block are not included in the previously set white detection area 301, the processing skips step S204 and proceeds to step S205.

When the WB control circuit 103 determines that the i-th block is white (YES in step S203), then in step S204, the WB control circuit 103 integrates the color average values (R[i], G[i], and B[i]) of the block. The processing performed in steps S203 and S204 can be represented by the following equations:

$$SumR = \sum_{i=0}^{m} Sw[i] \times R[i]$$

$$SumG = \sum_{i=0}^{m} Sw[i] \times G[i]$$

$$SumB = \sum_{i=0}^{m} Sw[i] \times B[i].$$

In the above-described equations, when the color evaluation values (Cx[i] and Cy[i]) are included in the white detection area 301, SW[i] is defined as "1". When the color evaluation values (Cx[i] and Cy[i]) are not included in the white detection area 301, SW[i] is defined as "0".

In step S205, the WB control circuit 103 determines whether the above-described processing is performed on all of the blocks. When the processing is not performed on all of the blocks (NO in step S205), the processing returns to step S202 to repeatedly perform the above-described processing. On the other hand, when the processing is performed on all of the blocks (YES in step S205), the processing proceeds to step S206.

In step S206, the WB control circuit 103 calculates the first WB correction values (WBCol_R1, WBCol_G1, and WBCol_B1) based on the integrated values (SumR1, SumG1, and SumB1) of the acquired color average values using the following equations:

$$WBCol\_R1 = SumY1 \times 1024 / SumR1$$

$$WBCol\_G1 = SumY1 \times 1024 / SumG1$$

$$WBCol\_B1 = SumY1 \times 1024 / SumB1$$

where $SumY1 = (SumR1 + 2 \times SumG1 + SumB1)/4$.

As the first WB correction value, the WB correction values of the flash light may be previously set as the known values.

Next, the calculation processing of a second WB correction value (second white balance correction value), which is the WB correction value without flash will be described. The second WB correction value is the correction value calculated based on the image data captured with no flash lit (hereafter, referred to as "image data without flash").

Figure 4:
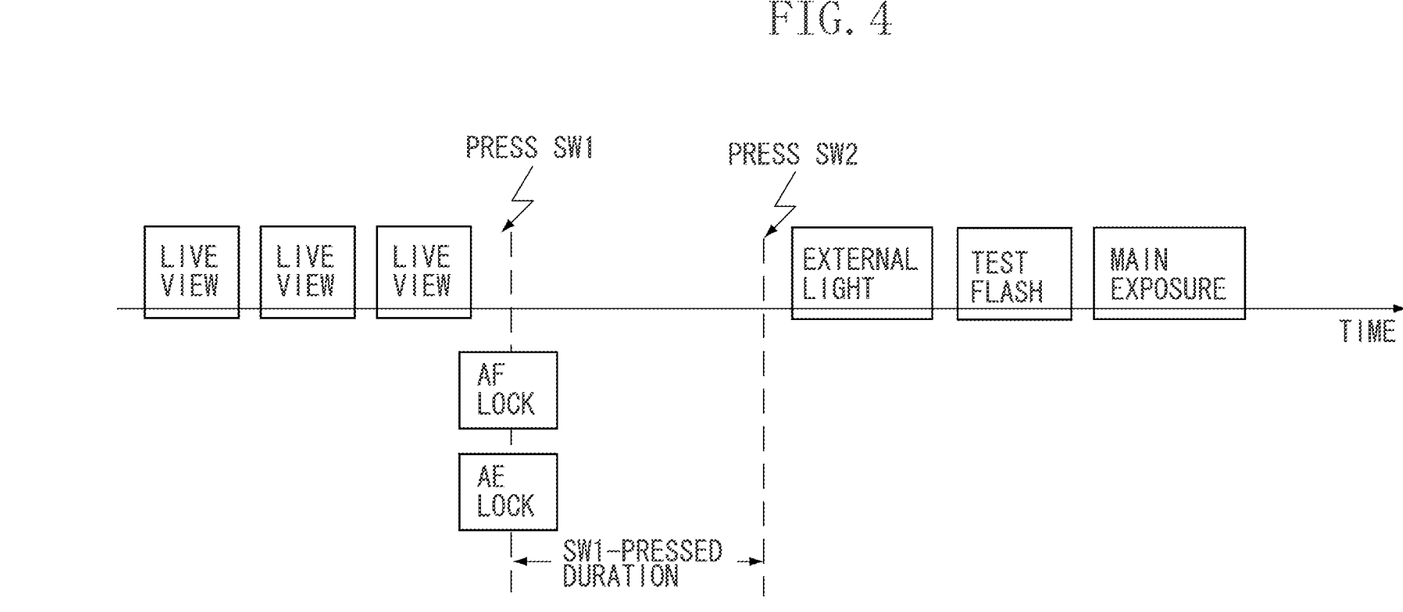
FIG. 4 illustrates capturing control items aligned in time series.

FIG. 4 illustrates capturing control items aligned in time series. As illustrated in FIG. 4, before a switch SW1 is pressed, live-view image data is periodically captured, and, while the switch SW1 is pressed, auto-focus (AF) lock and auto-exposure (AE) lock are performed.

After a switch SW2 is pressed, test flash and main exposure are performed. Image data captured during a time indicated with "external light" before test flash is herein defined as the image data without flash. As the image data without flash, the image data that is exposed after the main exposure and captured may be used.

The calculation processing of the second WB correction value is performed by the same method as that of the calculation processing of the first WB correction value described above. However, the calculation processing of the second WB correction value is different from that of the first WB correction value in that the processing is performed within a white detection area 302 for the external light as illustrated in FIG. 3. This is because, while the flash light is the known light source, the external light is not the known light source, and thus the white detection area 302 cannot be limited unlike the white detection area 301 with flash.

The white detection area 302 for the external light is acquired by capturing white under the different light source and plotting the calculated color evaluation values in advance. The white detection area 302 can be individually set by the capturing driving mode. The second WB correction value can be adopted even when the capturing driving mode is different. For example, the WB correction value of the EVF capturing driving mode that has been calculated in the past can be used.

Figure 5:
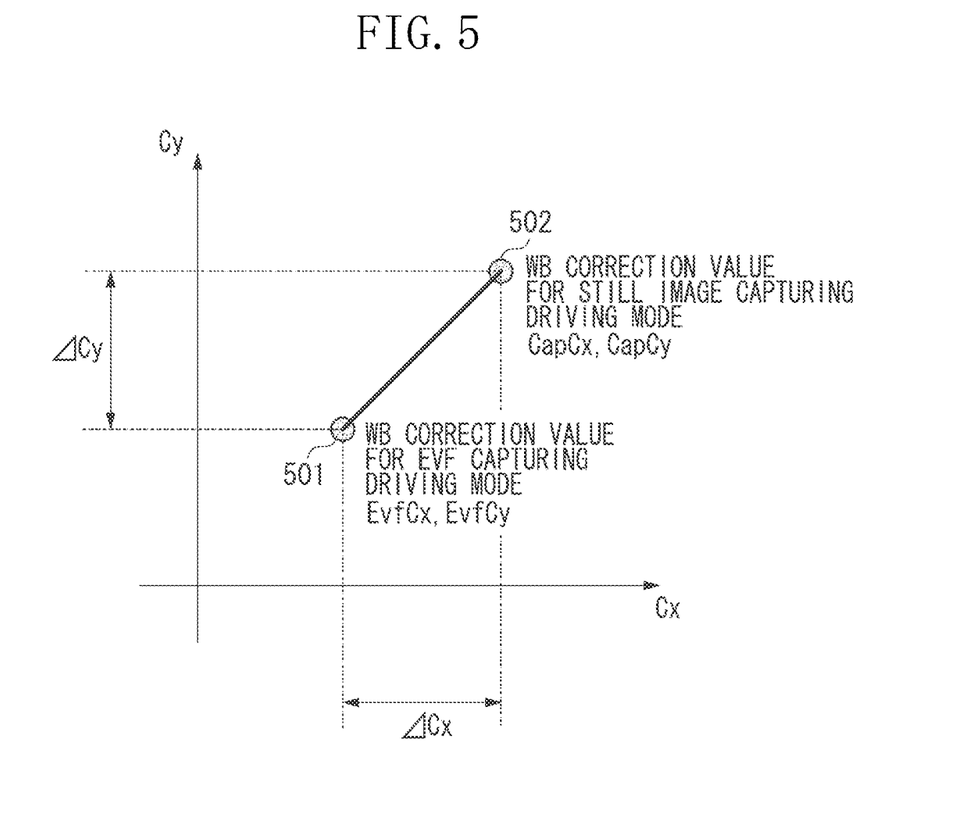
FIG. 5 illustrates a WB correction value for a still image capturing driving mode and a WB correction value for an electronic viewfinder (EVF) capturing driving mode.

However, when a spectral difference is generated depending on the capturing driving mode, the WB control circuit 103 corrects the WB correction value. FIG. 5 illustrates the WB correction value for the still image capturing driving mode and the WB correction value for the EVF capturing driving mode. When the WB correction value for the still image capturing driving mode is calculated using the WB correction value for the EVF capturing driving mode that was captured in the past, as illustrated in FIG. 5, the WB control circuit 103 corrects the WB correction values (EvfCx and EvfCy) 501 for the EVF capturing driving mode only by ΔCx and ΔCy. With this correction, the WB correction values (CapCx and CapCy) 502 for the still image capturing driving mode are calculated.

Figure 6:
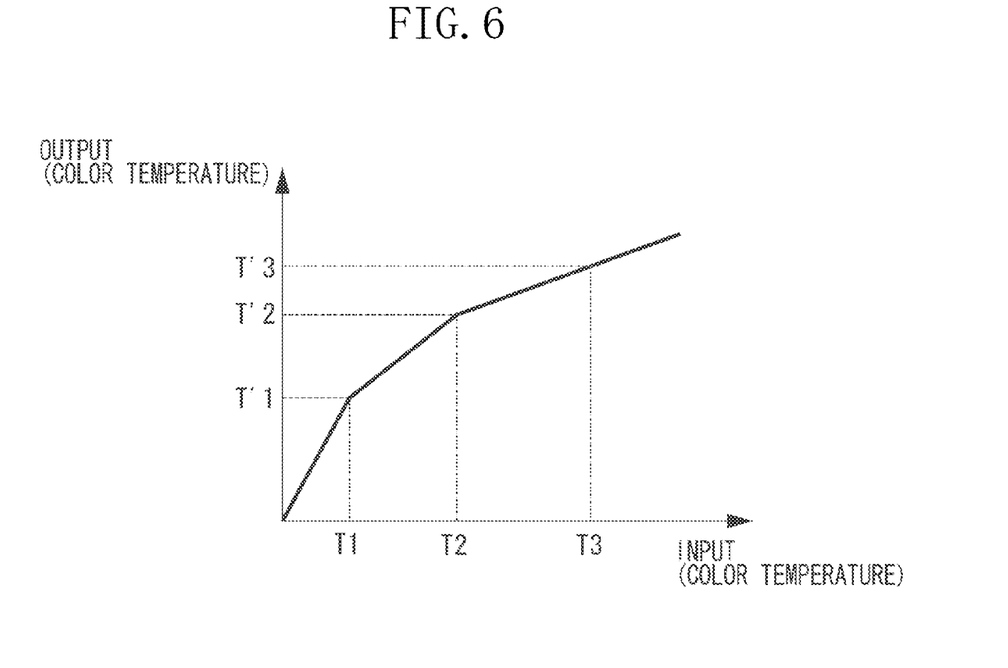
FIG. 6 illustrates a method for calculating a second WB correction value to leave tint in consideration of the atmosphere of a scene.

When the low-color temperature light source such as a bulb color light source is used in a background, the second WB correction value may be calculated to leave tint in consideration of the atmosphere of the scene. For example, as illustrated in FIG. 6, when the color temperature of the second WB correction value is low (e.g., T1 of input), by performing control to leave tint (e.g., T'1 of output), the image data in which tint of red of the bulb color light source is left can be generated.

Figure 7:
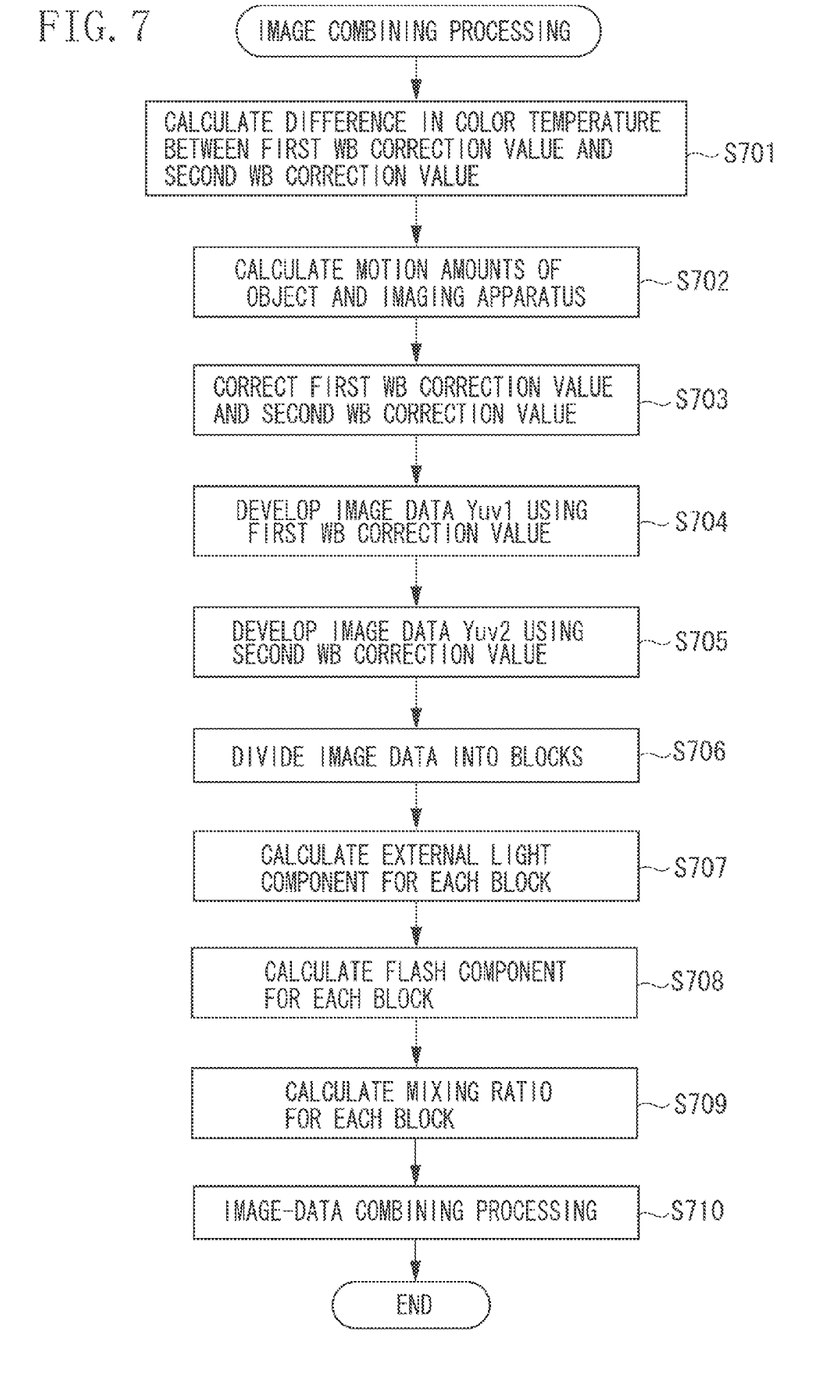
FIG. 7 is a flowchart illustrating processing for combining image data.

Next, with reference to a flowchart illustrated in FIG. 7, combining processing of the image data will be described. In step S701, the WB control circuit 103 calculates a difference in color temperature. More specifically, the WB control circuit 103 calculates the difference in color temperature between the first WB correction value, which is the WB correction value with flash, and the second WB correction value, which is the WB correction value without flash.

In step S702, the WB control circuit 103 calculates motion amounts of the object and the imaging apparatus. The motion amount of the imaging apparatus is calculated based on angular velocity information (a detection result of a motion) acquired by a gyro sensor (an inertial sensor) mounted in the control circuit 113. Further, the motion amount of the object can be acquired from the difference between the image data captured with the external light described above and the image data captured by the main exposure.

More specifically, the angular velocity information is calculated by averaging the angular velocity information acquired at a predetermined cycle during the main exposure. As described above, the motion amount acquired based on the angular velocity information becomes the motion amount of the imaging apparatus. Furthermore, the difference between the image data captured with the external light and the image data captured with the main exposure corresponds to the difference between the image data captured by the main exposure and the image data captured with flash.

Therefore, the WB control circuit 103 performs signal processing on the image data captured with the external light and the image data captured with flash, and subsequently acquires the difference between the image data. In other words, the WB control circuit 103 extracts luminance edge signals from the image data captured with the external light and the image data captured with flash, acquires the differences between the luminance edge signals, and then calculates the motion amount.

As described above, the motion amount calculated based on the differences between the image data becomes the motion amount of the object. The WB control circuit 103 calculates a sum of the motion amounts of the imaging apparatus and the motion amounts of the object to acquire a final motion amount. Step S701 is an example of processing performed by a difference calculation unit. Step S702 is an example of processing performed by a motion amount calculation unit.

Figure 8:
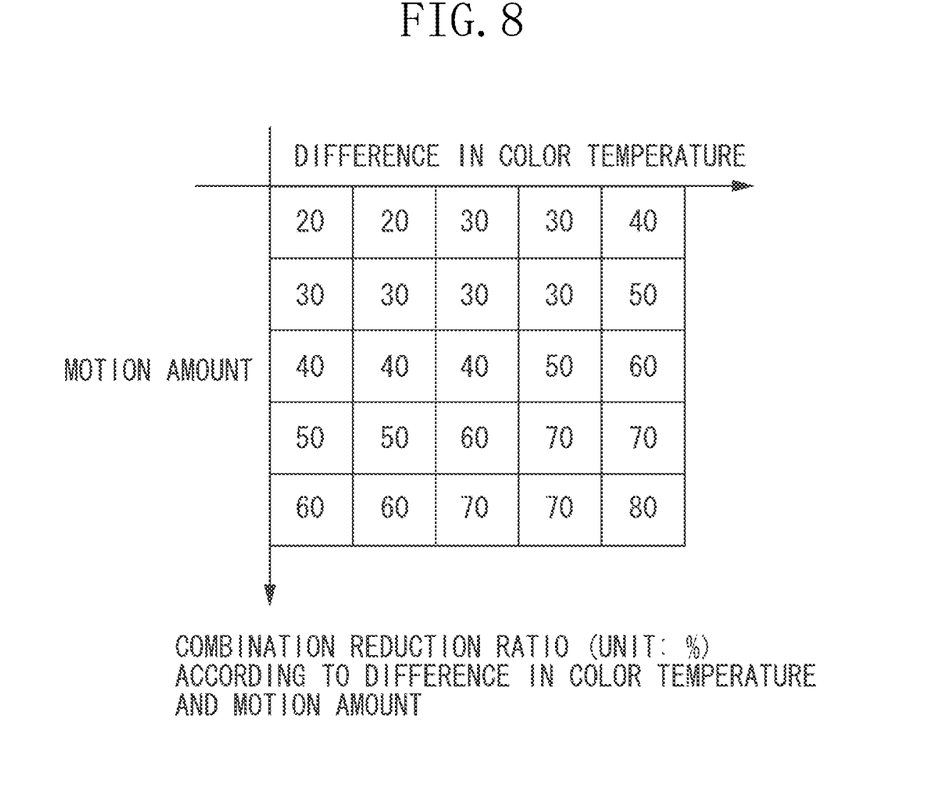
FIG. 8 illustrates a two-dimensional table to be referred to when correction is performed on a WB correction value.

In step S703, the WB control circuit 103 corrects the first and second WB correction values based on the difference in color temperature calculated in step S701 and the motion amounts calculated in step S702. When the correction is performed on the WB correction values described above, with reference to a two-dimensional table illustrated in FIG. 8, a combination reduction ratio according to the difference in color temperature and the motion amounts is acquired.

Using the acquired combination reduction ratio, the WB control circuit 103 corrects the first WB correction values (WBCol_R1, WBCol_G1, and WBCol_B1) and the second WB correction values (WBCol_R2, WBCol_G2, and WBCol_B2) indicated as below:

$WBCol\_R1 = WBCol\_R1 + (WBCol\_R2 - WBCol\_R1) \times 0.5 \times \text{Combination Reduction Ratio}$ $WBCol\_G1 = WBCol\_G1 + (WBCol\_G2 - WBCol\_G1) \times 0.5 \times \text{Combination Reduction Ratio}$ $WBCol\_B1 = WBCol\_B1 + (WBCol\_B2 - WBCol\_B1) \times 0.5 \times \text{Combination Reduction Ratio}$ $WBCol\_R2 = WBCol\_R2 + (WBCol\_R1 - WBCol\_R2) \times 0.5 \times \text{Combination Reduction Ratio}$ $WBCol\_G2 = WBCol\_G2 + (WBCol\_G1 - WBCol\_G2) \times 0.5 \times \text{Combination Reduction Ratio}$ $WBCol\_B2 = WBCol\_B2 + (WBCol\_B1 - WBCol\_B2) \times 0.5 \times \text{Combination Reduction Ratio}.$ With the above-described correction, the first and second WB correction values are corrected such that the WB correction values of the first and second WB correction values become closer to each other along with the rising combination reduction ratio. At that point, the WB control circuit 103 corrects both of the WB correction values of the first and second WB correction values to become closer to each other, or fixes either one WB correction value of the first and second WB correction values and corrects the other WB correction value to become closer to the one WB correction value.

In step S704, the WB control circuit 103 develops image data Yuv1 from the image data with flash using the above-described first WB correction value. In step S705, the WB control circuit 103 develops image data Yuv2 from the image data without flash using the above-described second WB correction value. In step S706, the WB control circuit 103 divides each of the image data with flash, the image data without flash, the image data Yuv1, and the image data Yuv2 into "n" blocks.

In step S707, the WB control circuit 103 adds and averages the pixel values for each color to calculate the color average values (R2[i], G2[i], and B2[i]) for each block (1 to "n") of the image data without flash, and then calculates the luminance value a[i] for each block. An equation for calculating the luminance value a[i] of each block is represented as the equation indicated below. The calculated luminance value a[i] of each block is herein defined as a luminance component (hereafter, referred to as an "external light component") of the external light of each block.

$a[i] = 0.3 \ast R2[i] + 0.6 G2[i] + 0.1 \ast B2[i]$

In step S708, similar to the processing for calculating the luminance value a[i] of each block from the image data without flash, the WB control circuit 103 adds and averages the pixel values for each color to calculate the color average values (R1[i], G1[i], and B1[i]) for each block (1 to "n") of the image data with flash, and then calculates the luminance value b[i] of each block. As indicated in the equation below, the WB control circuit 103 calculates a luminance component (hereafter, referred to as a "flash component") c[i] of the flash light of each block by subtracting, from the calculated luminance value b[i] of each block, the luminance value a[i] of each corresponding block of the image data without flash.

$c[i] = b[i] - a[i]$

In step S709, by the equation indicated below, the WB control circuit 103 calculates a mixing ratio α[i] of each block when the image data Yuv1 is combined with the image data Yuv2, based on the ratio of the flash component c[i] and the external light component a[i] of each corresponding block.

$\alpha[i] = c[i] / (a[i] + c[i])$

In step S710, the WB control circuit 103 combines the image data Yuv1 with the image data Yuv2 using the mixing ratio α[i] of each block to generate combined image data Yuv3. The color evaluation values (Y3 [i], u3 [i], and v3 [i]) of the combined image data Yuv3 are calculated by the equations indicated below, using the color evaluation values (Y1 [i], u1[i], and v1[i]) of the image data Yuv1 and the color evaluation values (Y2 [i], u2 [i], and v2 [i]) of the image data Yuv2.

$Y3[i] = Y1[i] \ast \alpha[i] + Y2[i] \ast (1 - \alpha[i])$ $u3[i] = u1[i] \ast \alpha[i] + u2[i] \ast (1 - \alpha[i])$ $v3[i] = v1[i] \ast \alpha[i] + v2[i] \ast (1 - \alpha[i])$ To reduce the tint variation at the boundary portion of a block, a mixing ratio α'[j] of each pixel may be calculated based on the mixing ratio α[i] of each block by performing pixel interpolation processing in step S709. For example, the WB control circuit 103 calculates the mixing ratio α'[j] of each pixel based on the mixing ratio α[i] of each block, using bilinear interpolation as the pixel interpolation processing. At this point, in step S710, the WB control circuit 103 combines the image data Yuv1 with the image data Yuv2 using the mixing ratio α'[j] of each pixel to generate the combined image data Yuv3.

The color evaluation values (Y3 [j], u3 [j], and v3 [j]) of the image data Yuv3 are calculated by the equations indicated below, using the color evaluation values (Y1[j], u1[j], and v1[j]) of the image data Yuv1 and the color evaluation values (Y2 [j], u2 [j], and v2 [j]) of the image data Yuv2.

$Y3[j] = Y1[j] \ast \alpha'[j] + Y2[j] \ast (1 - \alpha'[i])$ $u3[j] = u1[j] \ast \alpha'[j] + u2[j] \ast (1 - \alpha'[i])$ $v3[j] = v1[j] \ast \alpha'[j] + v2[j] \ast (1 - \alpha'[i])$ Further, in step S710, according to the luminance value of each block in the image data with flash, the processing may be varied by determining whether to perform the image combining processing for each block. In other words, when the luminance value of each block is low or high, the combination processing of the image data is not performed on the block but development processing of the image data is performed using the WB correction value calculated by the normal white balance control described below.

On the other hand, when the luminance value of the block is not low nor high, the same processing as the combining processing of the image data described above is performed. A signal component of the image data Yuv1 and a signal component of the image data Yuv2 may be combined at an equal ratio.

Next, a normal white balance control method will be described in detail. First, similar to the calculation processing of the WB correction value described above, the WB control circuit 103 calculates the first and second WB correction values. Next, the WB control circuit 103 performs mixing (summation and addition) processing of the first and second WB correction values. The mixing (summation and addition) processing performs summation and addition according to illumination ratios of the external light and the flash light with which the object is illuminated.

Figure 9:
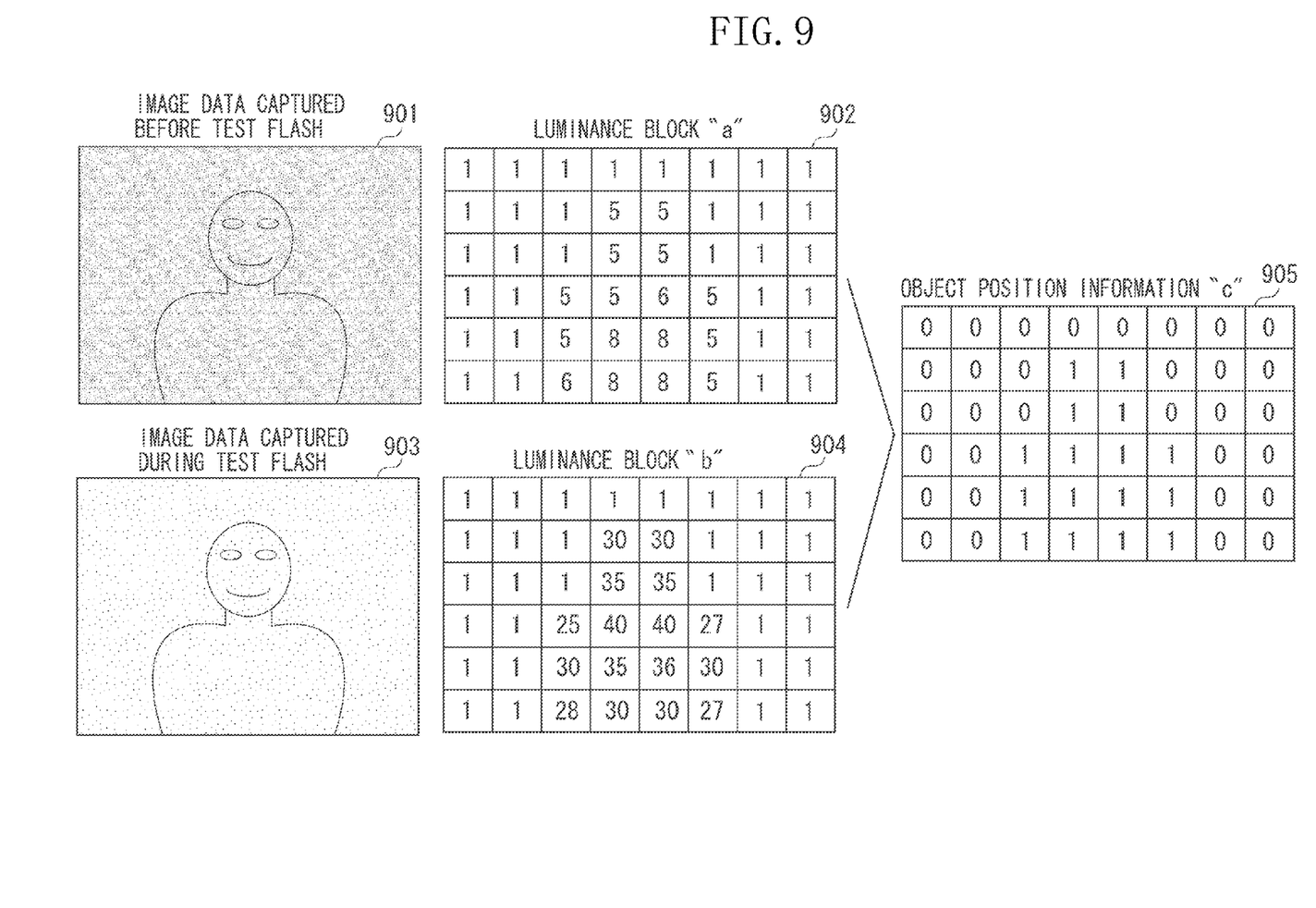
FIG. 9 illustrates clipping of an object region to calculate an illumination ratio.

With reference to FIG. 9, clipping of an object region for calculating the illumination ratio will be described. The WB control circuit 103 acquires image data 901 captured before test flash and calculates a luminance block (a) 902 including a matrix of "m"×"n" from the image data 901 captured before the test flash. Next, by performing test flash under the same condition as before test flash, the WB control circuit 103 acquires image data 903 captured during test flash, and similarly, acquires a luminance block (b) 904 including a matrix of "m"×"n".

The luminance block (a) 902 and the luminance block (b) 904 are temporarily stored in a random access memory (RAM) included in the imaging apparatus. A background image of the image data 901 captured before test flash and a background image of the image data 903 captured during test flash have no substantial difference. Therefore, difference data between the luminance block (a) 902 and the luminance block (b) 904 becomes reflection light in the object region during test flash, so that object position information (c) 905 can be acquired from the difference data.

The WB control circuit 103 acquires an object position block having a value of "1" from the object position information (c) 905 calculated as described above, and calculates a luminance value Y1 with flash in the object position block and a luminance value Y2 without flash. When exposure conditions for "with flash" and "without flash" are different from each other, the WB control circuit 103 fixes the conditions to be the same and then calculates the luminance values Y1 and Y2 under the same exposure conditions.

The calculated ratio of the luminance values Y1 and Y2 as described above is used as a ratio of light amounts with which the object is illuminated. The WB control circuit 103 performs the mixing processing (summation and addition) at the ratio of the light amounts using the first and second WB correction values. The WB control circuit 103 determines the WB correction value acquired by the mixing processing as the WB correction value to be used for the WB processing, and develops the image data to generate the final image data.

According to the above-described exemplary embodiment, when both of the object and the background are appropriately colored in a scene captured with flash, the tint variation at the boundary portion when the object and the imaging apparatus are moved can be reduced, and thus the image desirable for a user can be provided.

Further, according to the present exemplary embodiment, a restriction does not need to be provided for limiting the difference between the white balance correction values each applied for the object and the background within a predetermined area in a case where the object and the imaging apparatus are moved. Therefore, when the object and the imaging apparatus stay still, the object and the background can be most appropriately colored.

Figure 10:
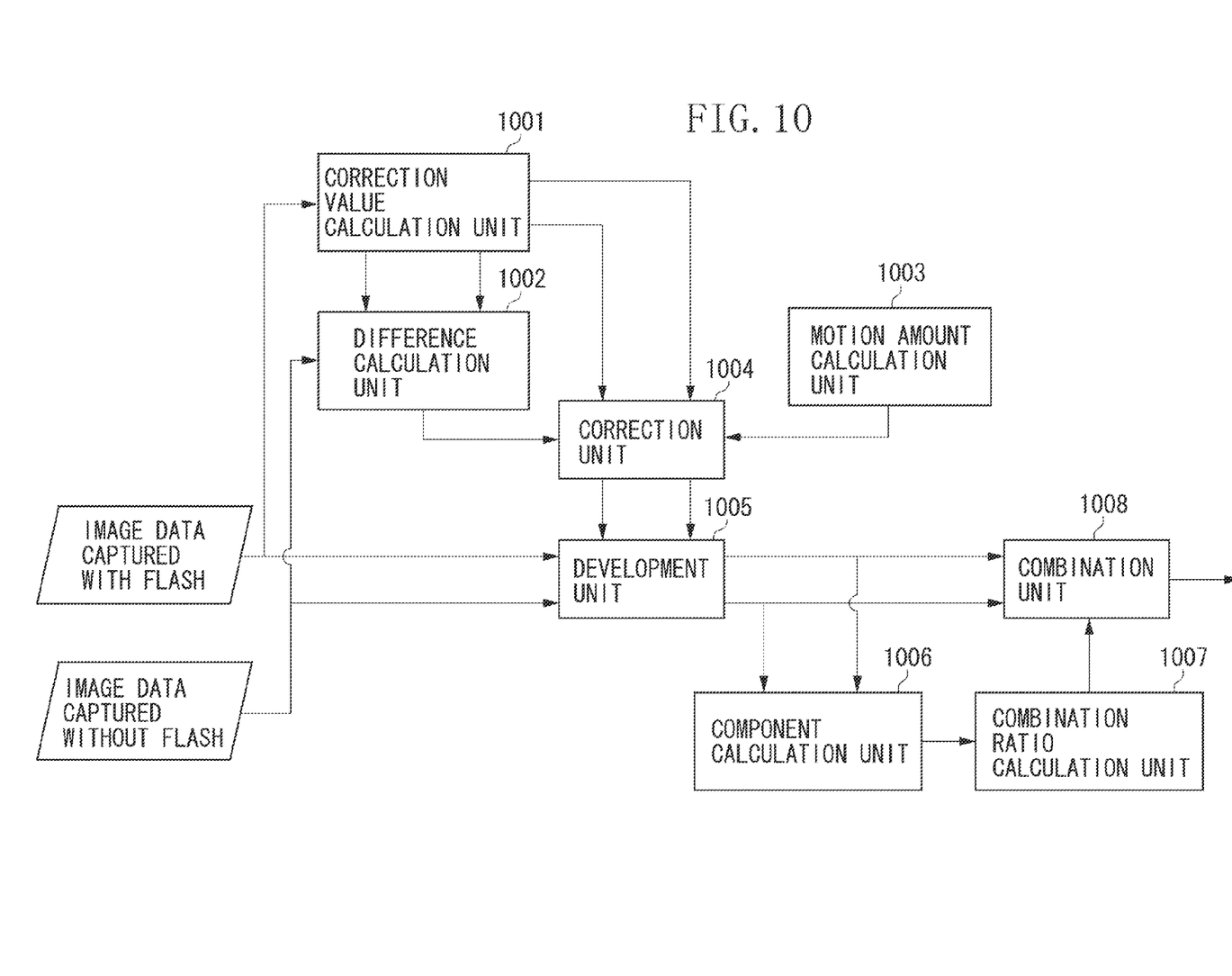
FIG. 10 illustrates another configuration of an imaging apparatus according to an exemplary embodiment of the present invention.

FIG. 10 illustrates another configuration of an imaging apparatus according to an exemplary embodiment of the present invention. The image processing apparatus includes a correction value calculation unit 1001, a difference calculation unit 1002, a motion amount calculation unit 1003, a correction unit 1004, a development unit 1005, a component calculation unit 1006, a combination ratio calculation unit 1007, and a combination unit 1008.

The correction value calculation unit 1001 calculates a first white balance correction value based on image data captured with flash and calculates a second white balance correction value based on image data captured without flash. The difference calculation unit 1002 calculates a difference in color temperature between the first white balance correction value and the second white balance correction value. The motion amount calculation unit 1003 calculates a motion amount of at least one of an object and the image processing apparatus.

The correction unit 1004 corrects the first white balance correction value and the second white balance correction value based on at least one of the difference in color temperature and the motion amount. The development unit 1005 develops first image data from the image data captured with flash based on the first white balance correction value corrected by the correction unit 1004 and develops second image data from the image data captured without flash based on the second white balance correction value corrected by the correction unit 1004. The component calculation unit 1006 calculates a luminance component of external light and a luminance component of flash based on a luminance value of the image data captured without flash and a luminance value of the image data captured with flash. The combination ratio calculation unit 1007 calculates a combination ratio of the first image data and the second image data based on the luminance component of external light and the luminance component of flash. The combination unit 1008 combines the first image data with the second image data according to the combination ratio.

The combination ratio calculation unit 1007 may be configured to calculate the combination ratio of the first image data and the second image data for each block based on the luminance component of external light and the luminance component of flash in each block. The combination ratio calculation unit 1007 may also be configured calculate the combination ratio for each pixel based on the combination ratio for each block by pixel interpolation processing. The combination unit 1008 may be configured to control whether to perform combining processing on applicable blocks according to a luminance value of each block. The correction value calculation unit 1001 may be configured to calculate the second white balance correction value to leave arbitrary tint for a light source. The motion amount calculation unit 1003 may be configured to calculate the motion amount of at least one of the image processing apparatus and the object based on at least one of a detection result of a motion of the image processing apparatus by an inertial sensor and an analysis result of a motion of the object based on the image data captured with flash and the image data captured without flash. The correction unit 1004 may be configured to correct the first white balance correction value and the second white balance correction value to become closer to each other, or to correct, while fixing one of the first white balance correction value and the second white balance correction value, the other of the first white balance correction value and the second white balance correction value to become closer to the one of the first white balance correction value and the second white balance correction value.

Aspects of the present invention can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-103520 filed May 6, 2011, which is hereby incorporated by reference herein in its entirety.

What is claimed is:

1. An image processing apparatus comprising:
   a correction value calculation unit configured to calculate a first white balance correction value based on image data captured with flash and to calculate a second white balance correction value based on image data captured without flash;
   a difference calculation unit configured to calculate a difference in color temperature between the first white balance correction value and the second white balance correction value;
   a motion amount calculation unit configured to calculate a motion amount of at least one of an object and the image processing apparatus;
   a correction unit configured to correct the first white balance correction value and the second white balance correction value based on at least one of the difference in color temperature and the motion amount;
   a development unit configured to develop first image data from the image data captured with flash based on the first white balance correction value corrected by the correction unit and to develop second image data from the image data captured without flash based on the second white balance correction value corrected by the correction unit;
   a component calculation unit configured to calculate a luminance component of external light and a luminance component of flash based on a luminance value of the image data captured without flash and a luminance value of the image data captured with flash;
   a combination ratio calculation unit configured to calculate a combination ratio of the first image data and the second image data based on the luminance component of external light and the luminance component of flash; and
   a combination unit configured to combine the first image data with the second image data according to the combination ratio.

2. The image processing apparatus according to claim 1, wherein the combination ratio calculation unit is configured to calculate the combination ratio of the first image data and the second image data for each block based on the luminance component of external light and the luminance component of flash in each block.

3. The image processing apparatus according to claim 2, wherein the combination ratio calculation unit is configured to calculate the combination ratio for each pixel based on the combination ratio for each block by pixel interpolation processing.

4. The image processing apparatus according to claim 1, wherein the combination unit is configured to control whether to perform combining processing on applicable blocks according to a luminance value of each block.

5. The image processing apparatus according to claim 1, wherein the correction value calculation unit is configured to calculate the second white balance correction value to leave arbitrary tint for a light source.

6. The image processing apparatus according to claim 1, wherein the motion amount calculation unit is configured to calculate the motion amount of at least one of the image processing apparatus and the object based on at least one of a detection result of a motion of the image processing apparatus by an inertial sensor and an analysis result of a motion of the object based on the image data captured with flash and the image data captured without flash.

7. The image processing apparatus according to claim 1, wherein the correction unit is configured to correct the first white balance correction value and the second white balance correction value to become closer to each other, or to correct, while fixing one of the first white balance correction value and the second white balance correction value, the other of the first white balance correction value and the second white balance correction value to become closer to the one of the first white balance correction value and the second white balance correction value.

8. An image processing method comprising:
   calculating a first white balance correction value based on image data captured with flash and calculating a second white balance correction value based on image data captured without flash;
   calculating a difference in color temperature between the first white balance correction value and the second white balance correction value;
   calculating a motion amount of at least one of an object and an image processing apparatus;
   correcting the first white balance correction value and the second white balance correction value based on at least one of the difference in color temperature and the motion amount;
   developing first image data from the image data captured with flash based on the corrected first white balance correction value and developing second image data from the image data captured without flash based on the corrected second white balance correction value;
   calculating a luminance component of external light and a luminance component of flash based on a luminance value of the image data captured without flash and a luminance value of the image data captured with flash;
   calculating a combination ratio of the first image data and the second image data based on the luminance component of external light and the luminance component of flash; and
   combining the first image data with the second image data according to the combination ratio.

9. A non-transitory computer-readable medium storing a program causing a computer to execute a method comprising:
   calculating a first white balance correction value based on image data captured with flash and calculating a second white balance correction value based on image data captured without flash;
   calculating a difference in color temperature between the first white balance correction value and the second white balance correction value;
   calculating a motion amount of at least one of an object and an image processing apparatus;
   correcting the first white balance correction value and the second white balance correction value based on at least one of the difference in color temperature and the motion amount;
   developing first image data from the image data captured with flash based on the corrected first white balance correction value and developing second image data from the image data captured without flash based on the corrected second white balance correction value;
   calculating a luminance component of external light and a luminance component of flash based on a luminance value of the image data captured without flash and a luminance value of the image data captured with flash;
   calculating a combination ratio of the first image data and the second image data based on the luminance component of external light and the luminance component of flash; and combining the first image data with the second image data according to the combination ratio.

* * * * *